(12) United States Patent
Odate et al.

(10) Patent No.: US 8,141,806 B2
(45) Date of Patent: Mar. 27, 2012

(54) SEATBELT APPARATUS FOR VEHICLE

(75) Inventors: Shotaro Odate, Utsunomiya (JP); Yo Ito, Utsunomiya (JP); Osamu Tsurumiya, Shimotsuke (JP); Yutaka Wakisaka, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 332 days.

(21) Appl. No.: 12/577,779

(22) Filed: Oct. 13, 2009

(65) Prior Publication Data
US 2010/0156083 A1 Jun. 24, 2010

(30) Foreign Application Priority Data
Dec. 18, 2008 (JP) ................................. 2008-322381

(51) Int. Cl.
*B60R 22/40* (2006.01)

(52) U.S. Cl. .................. 242/384; 242/382.2; 242/384.1; 701/45

(58) Field of Classification Search ............... 242/382.1, 242/382.2, 384, 384.1, 384.5–384.6; 701/45
See application file for complete search history.

(56) References Cited

U.S. PATENT DOCUMENTS

| | | | | |
|---|---|---|---|---|
| 6,685,124 | B2 * | 2/2004 | Frank | 242/374 |
| 2004/0089758 | A1 | 5/2004 | Bullinger et al. | |
| 2007/0158488 | A1 | 7/2007 | Bogenrieder et al. | |
| 2007/0295852 | A1 * | 12/2007 | Midorikawa | 242/390.9 |
| 2008/0017744 | A1 * | 1/2008 | Odate | 242/382.2 |

FOREIGN PATENT DOCUMENTS

| | | |
|---|---|---|
| DE | 10 2006 044 456 A | 4/2008 |
| JP | 2004-262258 | 9/2004 |
| JP | 2005-028970 | 2/2005 |
| JP | 2008-105552 | 5/2008 |

* cited by examiner

*Primary Examiner* — Sang Kim
(74) *Attorney, Agent, or Firm* — Rankin, Hill & Clark LLP (57) ABSTRACT

A seat belt apparatus for a vehicle including: a belt reel; a emergency locking retractor which performs a mechanical locking of the belt reel so as not to rotate in a direction of unwinding a webbing when an unstable behavior of the vehicle is detected by a vehicle condition detection device, and then automatically release the locking if the belt reel rotates in a direction of winding the webbing greater than or equal to a predetermined amount; and a locking continuity determination device which determines whether or not the locking continues after the emergency locking retractor performs the locking based on the vehicle condition and variation of the rotational position of the belt reel, wherein a control device makes a driving motor rotate so as to release the locking if the locking continuity determination device determines the locking continues for greater than or equal to a predetermined amount of time.

4 Claims, 11 Drawing Sheets

SEATBELT APPARATUS FOR VEHICLE

Priority is claimed on Japanese Patent Application No. 2008-322381, filed Dec. 18, 2008, the contents of which are incorporated herein by reference.

BACKGROUND OF THE INVENTION

1. Field of the Invention

The present invention relates to a seatbelt apparatus for a vehicle that restrains an occupant in a seat by a webbing.

2. Description of the Related Art

A known seatbelt apparatus for a vehicle has an emergency locking retractor that mechanically locks a webbing so as not to be pulled out when the vehicle is in emergent circumstances in which the behavior of the vehicle is unstable.

In the emergency lock mechanism, a lateral face of a belt reel, around which a webbing is wound, is provided with a locking activation drum that rotates relative to a belt reel when a torque greater than or equal to a predetermined amount is acted between the locking activation drum and the belt reel; and a locking claw that meshes with a lock groove of a casing when the belt reel rotates relative to the locking activation drum in a predetermined direction. In addition, the emergency lock mechanism, at a position closer to the locking activation drum, is provided with an emergency operation unit that is activated when the vehicle is in an unstable state (e.g., when acceleration greater than or equal to a predetermined amount acts on the vehicle or the vehicle inclines at an angle greater than or equal to a predetermined amount). The activation of the emergency operation unit thereby gives a braking power to the locking activation drum.

For this reason, the activation of the emergency operation unit due to such unstable behavior of the vehicle brakes the locking activation drum, and the belt reel rotates relative to the locking activation drum in a first direction when the webbing is just about to be pulled out. The rotation makes the locking claw mesh with the lock groove, and thereby locking the belt reel so as not to rotate in the webbing unwinding direction.

Further, if the belt reel starts rotating in the webbing winding direction due to a force from a return spring, in which the belt reel loses a driving force in the webbing unwinding direction because of the activation of the emergency locking retractor, the mesh between the locking claw and the lock groove is automatically released after a predetermined amount of rotation of the belt reel relative to the locking activation drum in a second direction.

Incidentally, there has been known a seatbelt apparatus in which a driving motor is connected to a belt reel in order to help a return spring to wind a webbing and to restrain an occupant in response to a state of a vehicle (refer, for example, to Japanese Unexamined Patent Application, First Publication No. 2008-105552).

In the seatbelt apparatus having a driving motor described above, the driving motor is driven if a buckle of a seatbelt is pulled out or a change of a vehicle state is detected. Therefore, the driving motor is not directly involved in unlocking the emergency locking retractor of which the operation is mechanically independent. Normally, the unlocking of the emergency locking retractor is performed by a force from a return spring when the vehicle recovers from an unstable state. However, it is difficult to perform an automatic unlocking in the following circumstances (1) and (2).

(1) There is no substantial margin for winding the webbing when the webbing is rapidly or gradually wound up by the return spring during large fluctuations of the upper body of an occupant in which the emergency locking retractor is activated due to abrupt acceleration of the vehicle or traveling of the vehicle on a rough road.

Specifically, the case is, even when the vehicle recovers from an unstable state, the automatic unlocking by the return spring is impossible because the reaction force from the tightly fastened occupant is large.

In this case, since the automatic unlocking of the webbing does not work, the occupant has to pull the buckle out.

(2) An upper body of an occupant receives slowly moves due to a weak centrifugal force or the occupant intentionally tries to move the upper body, after the emergency locking retractor is activated when the vehicle travels in a curve or takes a corner at a speed greater than or equal to a predetermined amount.

In this case, the occupant would more comfortably drive if the restraint by the webbing does not work, but actually an unnecessary restraint force acts on the occupant. That causes the occupant discomfort and makes it difficult for the occupant to handle the vehicle.

In view of the circumstances described above, the present invention has an object of providing a seatbelt apparatus for a vehicle that is capable of enhancing comfort and handling of the vehicle in which unnecessary locking, that is continuously effective after an activation of a emergency locking retractor, is released.

SUMMARY OF THE INVENTION

In order to achieve the above-described object, the present invention employs the following. In particular, a seat belt apparatus for a vehicle according to an aspect of the present invention includes: a belt reel around which a webbing is wound; a driving motor which drives the belt reel to rotate; a control device which controls the driving motor; a rotational position detection device which detects a rotational position of the belt reel; a vehicle condition detection device which detects a condition of the vehicle; a emergency locking retractor which performs a mechanical locking of the belt reel so as not to rotate in a direction of unwinding the webbing when an unstable behavior of the vehicle is detected by the vehicle condition detection device, and then automatically release the locking if the belt reel rotates in a direction of winding the webbing greater than or equal to a predetermined amount; and a locking continuity determination device which determines whether or not the locking continues after the emergency locking retractor performs the locking, based on the vehicle condition detected by the vehicle condition detection device and variation of the rotational position of the belt reel detected by the rotational position detection device, wherein the control device makes the driving motor rotate in a direction so as to release the locking if the locking continuity determination device determines the locking continues for greater than or equal to a predetermined amount of time.

In the seatbelt apparatus described above, when electric current is not conducted to the driving motor, the vehicle condition detection device detects unstable behavior of the vehicle in which locking operation is activated by the emergency locking retractor. Variation of the rotational position of the belt reel following the detection of the unstable behavior is detected by the rotational position detection device. During the detection of the rotational position, if the emergency locking retractor locks the belt reel so as not to rotate in the webbing unwinding direction, rotations of the belt reel in the webbing winding direction may be detected but rotations in the webbing unwinding direction cannot be detected.

Accordingly, the continuity of the locking state can be determined based on signals from the vehicle condition detection device and rotational position detection device. If the locking continuity determination device keeps determining that the locking state continues for greater than or equal to a predetermined amount of time when the locking state is not supposed to continue, the control device drives the driving motor to rotate, and thereby forcibly release the locking of the emergency locking retractor (unlocking).

According to the seatbelt apparatus for a vehicle described above, whether or not the locking state after the activation of the emergency locking retractor is determined by the locking continuity determination device. Therefore, in the case where the locking continuity determination device keeps determining that the locking state continues for greater than or equal to a predetermined amount of time when the locking state is not supposed to continue, the locking due to the emergency locking retractor can be forcibly released by the driving motor. As a result, it is possible to suppress the continuity of the unnecessary locking by the emergency locking retractor and thereby enhance the comfort and handling of the vehicle.

It may be arranged such that the control device adjusts an actual starting time when the driving motor starts driving to release the locking, based on the vehicle condition detected by the vehicle condition detection device during the determination by the locking continuity determination device.

In this case, the starting time when the driving motor starts driving to release the locking can be adjusted in response to the vehicle condition during the determination by the locking continuity determination device. For example, when the vehicle travels on a road with continuous curves, the starting time when the driving motor starts driving to release the locking is delayed if the speed of the vehicle, during the determination by the locking continuity determination device, is higher than a predetermined value. Accordingly, even when traveling on a road with continuous curves at high speed, it is possible to prevent the activation and releasing in the emergency locking retractor from frequently repeating.

In the above case, since the starting time when the driving motor starts driving to release the locking is adjusted in accordance with the vehicle condition during the determination by the locking continuity determination device, it is possible to suppress frequent repetition of activation and releasing in the emergency locking retractor. As a result, it is possible to reduce discomfort or unpleasant feeling which an occupant experiences.

DETAILED DESCRIPTION OF THE INVENTION

Embodiments of the present invention will be explained below with reference to the drawings. It should be noted that first, second and third embodiments each explained below are different from each other only in control system, but are substantially the same with regard to their mechanical configuration. First, common components between the embodiments are described.

Figure 1:
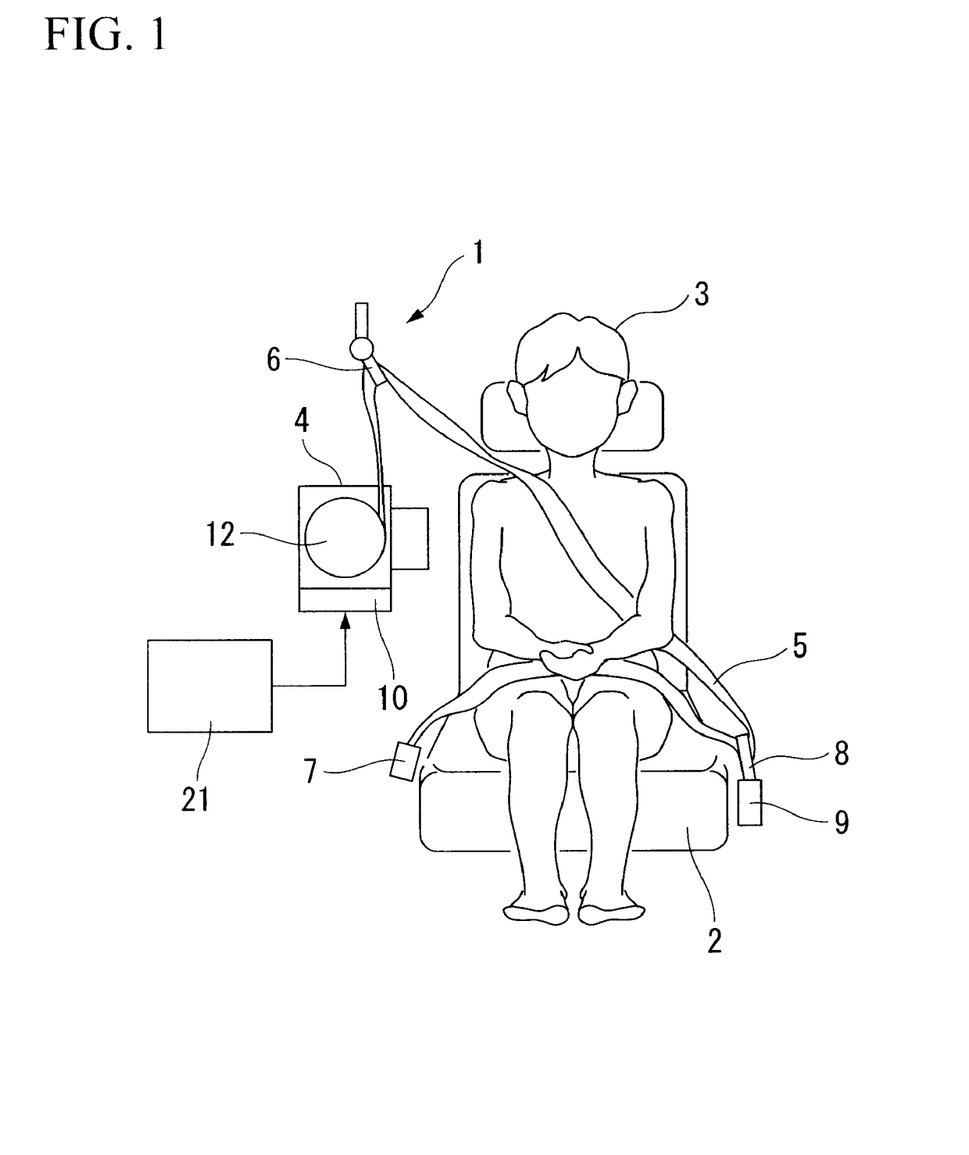
FIG. 1 is a schematic block diagram showing a seatbelt apparatus according to embodiments of the present invention.

FIG. 1 is a schematic block diagram showing the whole of a seatbelt apparatus 1 according to the present invention in which reference numeral 2 is used to denote a seat in which an occupant is seated. The seatbelt apparatus 1 according to the present embodiment is a so-called three-point seatbelt apparatus. Specifically, a webbing 5 is pulled out upward from a retractor 4 attached to a center pillar (not shown in the figures), and it is inserted through a through anchor 6 supported on the upper section of the center pillar. Moreover, the tip end section of the webbing 5 is fixed on a vehicle body floor via an outer anchor 7 on the outer side of a seat 2 in a passenger compartment. Further, the webbing 5 is inserted through a tongue plate 8 disposed between the through anchor 6 and the outer anchor 7. The tongue plate 8 can be attached to or removed from a buckle 9 fixed on the vehicle body floor on the inner side of the seat 2 in the passenger compartment.

The webbing 5 is pre-wound on the retractor 4 in the initial state. The occupant 3 sitting on the seat 2 pulls out this pre-wound webbing 5 and then fixes the tongue plate 8 to the buckle 9, thereby restraining mainly the chest and hip of the occupant 3 in the seat 2. In addition, when the vehicle is in emergency or the behavior of the vehicle is large, the webbing 5 is automatically wound up by an electric driving motor 10. Detailed explanation on how the driving motor 10 is controlled is omitted.

Figure 2:
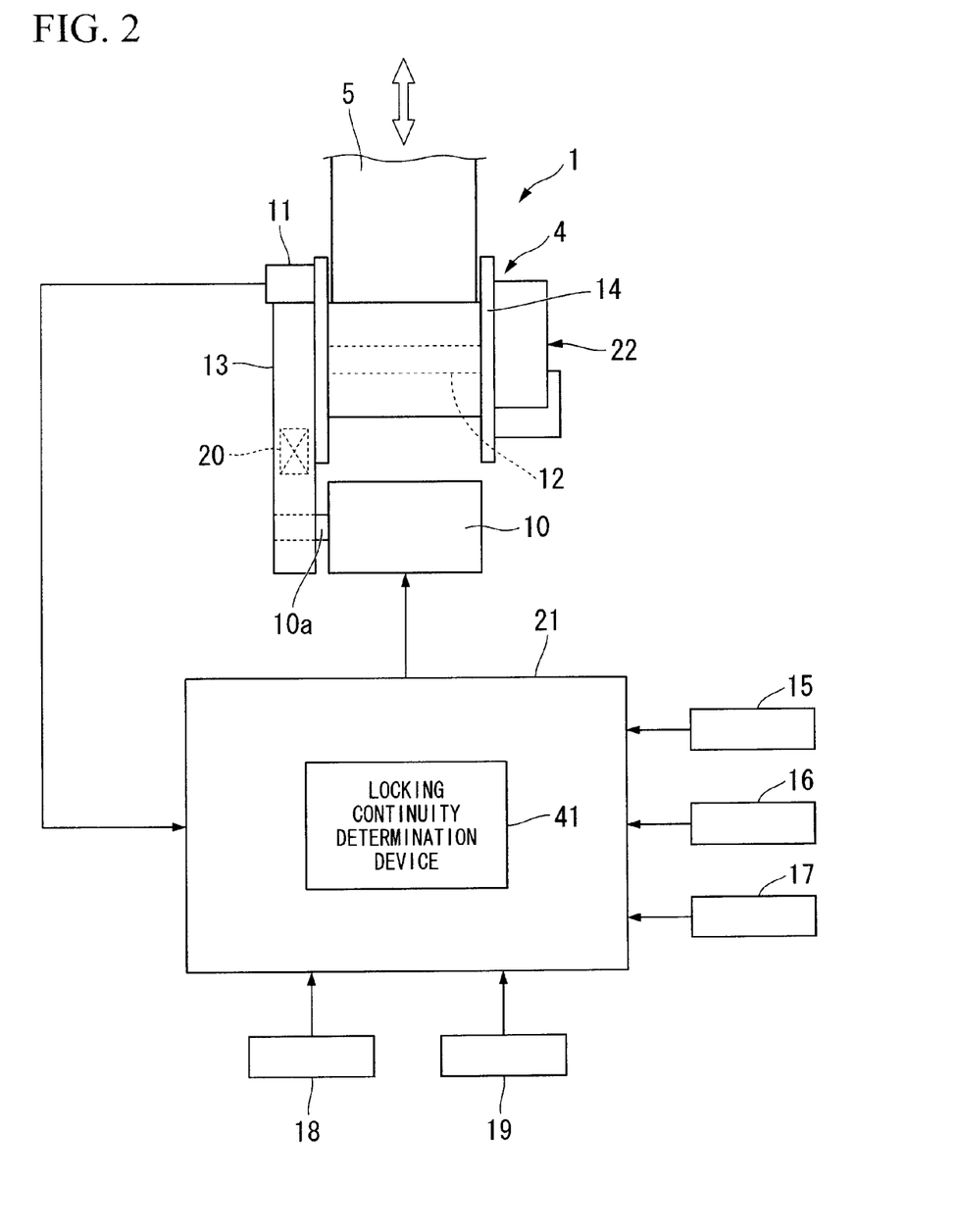
FIG. 2 is a schematic block diagram showing a retractor and a controller of the seatbelt apparatus according to the embodiments.

As shown in FIG. 2, the retractor 4 is rotatably housed in a casing 14 and has a belt reel 12 around which the webbing 5 is wound. The axis of the belt reel 12 protrudes toward a lateral side of the casing 14. The belt reel 12 is connected to and interlocked with a rotational axis 10a of the driving motor 10 via a power transmission mechanism 13 including a clutch 20. The power transmission mechanism 13 transmits the rotation of the driving motor 10 to the belt reel 12 while reducing the rotation rate. In addition, the retractor 4 is provided with a return spring (not shown in the figures) that biases the belt reel 12 toward the webbing winding direction. The biasing toward the webbing winding direction due to the return spring acts on the belt reel 12. The clutch 20 is controlled to switch between ON state and OFF state based on whether the motor 10 rotates in the normal direction (webbing winding direction) or in the reverse direction (webbing unwinding direction).

Moreover, the retractor 4 is provided with a rotation sensor 11 (rotational position detection device) which detects a rotational position of the belt reel 12. For example, the rotation sensor 11 includes: a magnetic disk which has different magnetic polarities alternately magnetized around the circumferential direction thereof and integrally rotates with the belt reel 12; a pair of Hall elements disposed in close proximity to the outer circumference of the magnetic disk; a sensor circuit that processes detection signals from the Hall elements. Pulse signals that have been processed in the sensor circuit are output to a controller 21.

The pulse signals that are input from the sensor circuit to the controller 21 in accordance with the rotation of the belt reel 12 is used to detect a rotation amount, a rotation rate, a rotation direction and the like. More specifically, in the controller 21, the rotation amount (the amount of the webbing 5 being pulled out or wound) is detected by counting the pulse signals, and then the rotation rate of the belt reel 12 (rate of pulling out or winding the webbing 5) is calculated from the change rate (frequency) of the pulse signal. Further, the rotation direction of the belt reel 12 is detected by comparing initial rises of the waveforms of both of the pulse signals.

To the controller 21, in addition to the rotation sensor 11, there are connected a vehicle speed sensor 15 that detects a traveling speed of the vehicle; a front-rear acceleration sensor 16 that detects vehicle acceleration in the front-rear direction; a left-right acceleration sensor 17 that detects vehicle acceleration in the left-right direction; a yaw rate sensor 18 that detects a yaw rate acting on the vehicle; a wheel speed sensor 19 for calculating a slip ratio of the wheel. Moreover, the controller 21 communicates with a VSA (Vehicle Stability Assist) controller that performs integrated control of the engine output and the braking power to suppress unstable behavior of the vehicle. It should be noted that, in the present embodiment, the vehicle speed sensor 15, the front-rear acceleration sensor 16, the left-right acceleration sensor 17, the yaw rate sensor 18, and the wheel speed sensor 19 constitute a vehicle condition detection device which detects a condition of the vehicle.

Further, the retractor 4 is provided with an emergency locking retractor 22 which mechanically locks the belt reel 12 so as not to rotate in the webbing unwinding direction when an acceleration greater than or equal to a predetermined amount acts on the vehicle (in a case where the vehicle becomes unstable), the webbing 5 is just about to be abruptly pulled out (in a case where the belt reel 12 is just about to rotate in the webbing unwinding direction abruptly), or the like.

Figure 3:
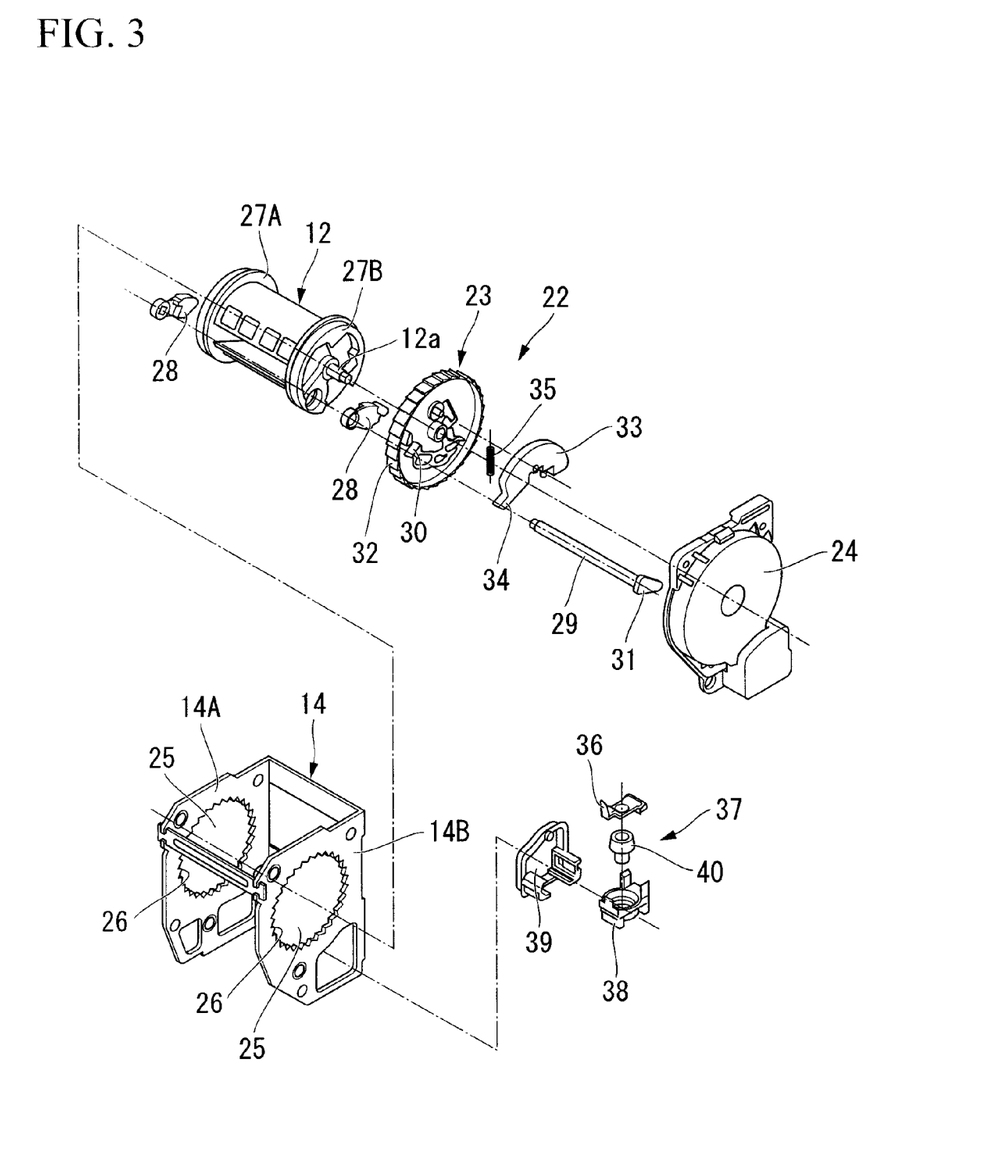
FIG. 3 is an exploded perspective view showing an emergency locking retractor according to the embodiments.

FIG. 3 shows detail of the emergency locking retractor 2 provide on the retractor 4.

The casing 14 has a pair of side walls 14A and 14B. The aforementioned transmission mechanism 13 and a spring case that houses the return spring (not shown in the figures) are attached to the side wall 14A. Meanwhile, a retainer 24 that supports a locking activation drum 23 described later is attached to the side wall 14B. In addition, both of the side walls 14A and 14B are provided with a hole 25 having substantially a circular shape. The inner circumference of the hole 25 is formed with a lock groove 26 that is inclined to the webbing winding direction.

Both ends, with respect to the axis direction, of the belt reel 12 are provided with support flanges 27A and 27B, respectively. A locking claw 28 is attached to the outer circumference edge section of the support flanges 27A and 27B, so as to swing. When the locking claw 28 rotates such that the tip thereof moves radially outward and the locking claw 28 protrudes, the locking claw 28 meshes with the lock groove 26 of the casing 14. The locking claw 28 locks the belt reel 12 so as not to rotate in the direction of unwinding (pulling out) by meshing with the locking groove 26 inclined to the webbing winding direction, but allows the belt reel 12 to rotate in the webbing winding direction. In additions, the locking claws 28 respectively supported by the support flanges 27A and 27B are connected by a connection pin 29 so as to integrally rotate with each other.

A reel axis 12a protrudes from a axis position of the support flange 27B that faces the retainer 24 of the belt reel 12, and fits into the locking activation drum 23. Since the locking activation drum 23 is fitted into the reel axis 12a with a small friction resistance, the locking activation drum 23 integrally rotates with the belt reel 12 in a normal of the belt reel 12. However, if a certain amount of opposite force is applied to the locking activation drum 23 and the belt reel 12, for example, the locking activation drum 23 rotates relative to the belt reel 12 within a predetermined angular range.

The outer circumference edge section of the locking activation drum 23 is provided with a long hole which an end section of the connection pin 29 penetrates. The end section of the connection pin 29 penetrating the locking activation drum 23 is provide with a cam piece 31 that touches the guide face of the locking activation drum 23. The cam piece 23 makes the connection pin 29 rotate in a direction due to the guide face 30 when the belt reel 12 rotates relative to the locking activation drum 23 in the webbing unwinding direction. After such rotation of the connection pin 29, support flanges 27A and 27B rotate so as to move the locking claw 28 to protrude outward.

The outer circumference face of the locking activation drum 23 is formed with a plurality of clutch teeth 32. In addition, an end face located axially outside the locking activation drum 23 is provided with lock arm 33 so as to swing. The lock arm 33 having a certain mass receives a centrifugal force and is attached to a position spaced apart from the rotation center of the locking activation drum 23 so as to swing. The tip of the lock arm 33 is provided with a locking claw 34 that receives a centrifugal force in response to the rotation of the locking activation drum 23 and is swung radially outward. In addition, a biasing spring 35, that always biases the locking claw 34 of the lock arm 33 radially inward of the locking activation drum 23, is provided between the locking activation drum 23 and the lock arm 33.

The retainer 24 is fixed on the casing 14 and covers the front and the surroundings of the locking activation drum 23 and the lock arm 33. The retainer 24 is provided with: an axle bearing structure (not shown in the figures) which rotatably supports the axis of the bell reel 12 and the locking activation drum 23, and clutch teeth (not shown in the figures) having an internal teeth structure which faces the outer circumference of the locking claw 34 of the lock arm 33. The locking claw 34 of the lock arm 33 meshes with the clutch teeth of the retainer 24 when the lock arm 33 receives a centrifugal force and swings radially outward. Because of this, the locking activation drum 23 is locked so as not to rotate, and thereby causes a relative rotation with respect to the belt reel 12. As a result, as described above, both locking claws 28 of the belt reel 12 meshes with the lock groove 26 of the casing 14. Therefore, the belt reel 12 is locked so as not to rotate in the webbing unwinding direction by means of the lock system including the lock arm 33, the retainer 24, and the clutch teeth 32 when the webbing 5 is tried to be abruptly pulled out. Hereinafter, the lock system is referred to as unwinding-sensitive locking system.

The lower portion of the retainer 24 is provided with a vehicle sensor 37 which activates a stopper claw 36 when perceive an acceleration of the vehicle. In the vehicle sensor 37, a sensor weight 40 is disposed in a containing portion that is surrounded by a sensor case 38 and a sensor cap 39. The stopper claw 36 is integrally attached to the sensor weight 40. When the sensor weight 40 swings greater or equal to a predetermined amount in response to the acceleration of the vehicle, the sensor weight 40 makes the stopper claw 36 mesh with the clutch teeth 32 of the locking activation drum 23.

As such, when the stopper claw 36 meshes with the clutch teeth 32, the locking activation drum 23 is locked so as not to rotate. Therefore, if the webbing 5 is tried to be pulled out in such state, the belt reel 12 rotates relative to the locking activation drum 23 and then the locking claw 28 of the belt reel 12 meshes with the lock groove 26 of the casing 14. As a result, the belt reel 12 is locked so as not to rotate in the webbing unwinding direction. Hereinafter, the lock system is referred to as vehicle body-sensitive locking system.

Here, in any of the unwinding-sensitive locking system or the vehicle body-sensitive locking system, after the belt reel 12 is locked so as not to rotate in the webbing unwinding direction, the locking is released if the belt reel 12 rotates greater than or equal to a predetermined amount in the webbing winding direction. More specifically, if the belt reel 12 rotates in the webbing winding direction when the locking activation drum 23 stops rotating, the relative position between the belt reel 12 and the locking activation drum 23 returns to the initial state. As a result, via the connection pin 29, the locking claw 28 rotates in the webbing unwinding direction to release the mesh between the locking claw 28 and the lock groove 26. It should be noted that the rotation of the belt reel 12 in the webbing winding direction is, basically, automatically performed due to a force from a return spring. However, in such special circumstances as explained later, the rotation is performed by the driving force of the driving motor 10.

As shown in FIG. 1, the controller 21 is provided with a locking continuity determination device 41 which determines, when electric current is not conducted to the driving motor 10, whether or not the locking of the emergency locking retractor 22 continues based on: the vehicle condition detected by the sensors 15-19; and variation of the rotational position of the belt reel 12 detected by the rotation sensor 11.

When values detected by the front-rear acceleration sensor 16 and the left-right acceleration sensor 17 are greater than or equal to a predetermined value, the locking continuity determination device 41 determines that the emergency locking retractor 22 is activated, reads the rotational position of the belt reel 12 at the time the activation is determined, and monitors rotational positions of the belt reel 12 thereafter. If the belt reel 12 rotates in the unwinding direction, the locking continuity determination device 41 determines that the locking is released. On the other hand, if the belt reel 12 rotates in the winding direction but does not rotate in the unwinding direction, the locking continuity determination device 41 determines that the locking state continues.

First Embodiment

In the present embodiment, the controller 21 controls the driving motor 10 so as to rotate the belt reel 12 greater than or equal to a predetermined amount if the locking continuity determination device 41 repeats to determine that the locking continues, after the vehicle goes into a condition where the emergency locking retractor 22 is activated.

Figure 4A:
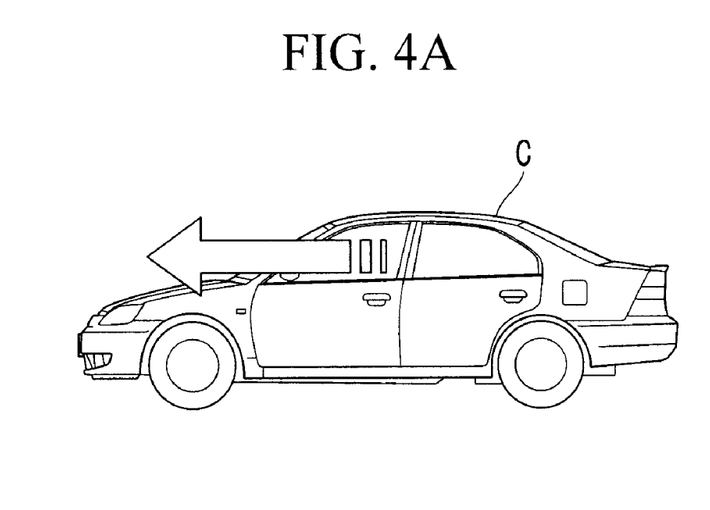
FIGS. 4A and 4B are views showing a first situation which is supposed in a control according to a first embodiment of the present invention.
Figure 4B:
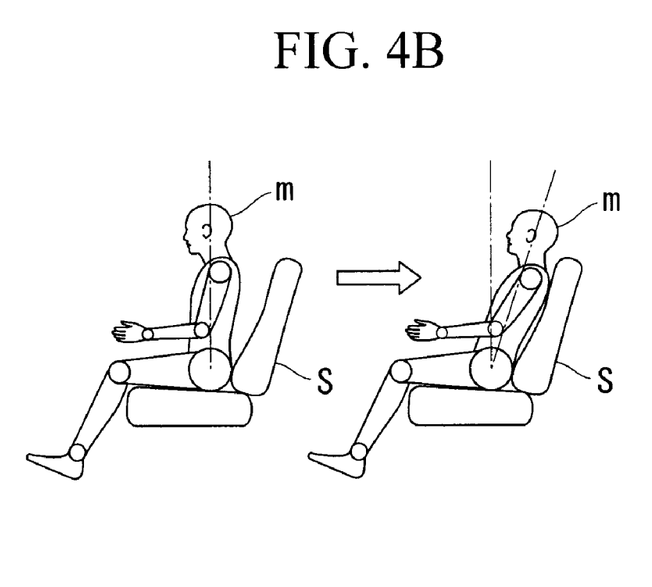
Figure 6A:
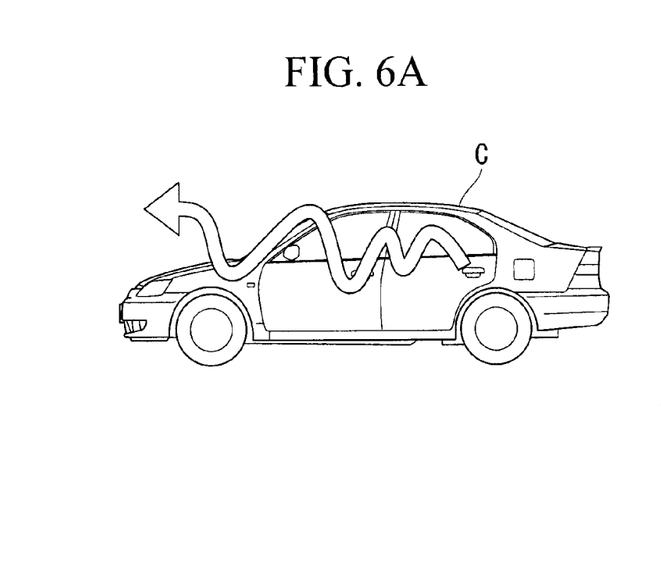
FIGS. 6A and 6B are views showing a second situation which is supposed in the control according to the embodiment.
Figure 6B:
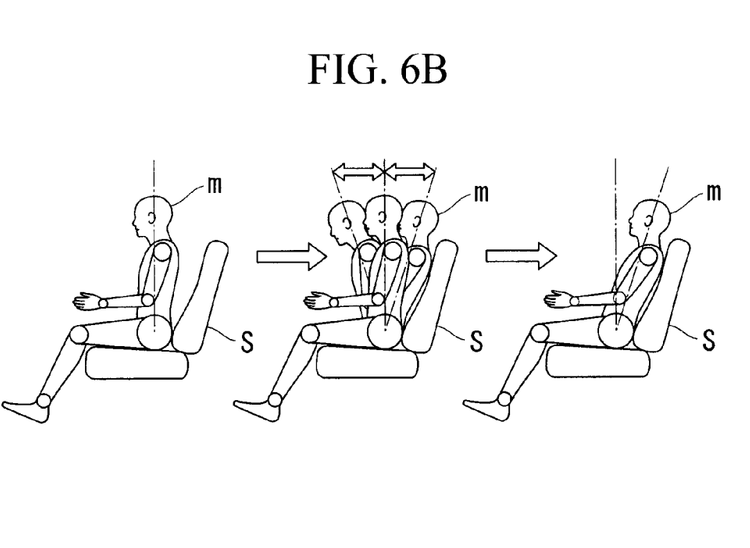

The controller 21 according to the present embodiment is designed assuming predetermined conditions when the vehicle is abruptly accelerated as shown in FIGS. 4A and 4B, when the vehicle travels on a rough road as shown in FIGS. 6A and 6B, and the like.

When the vehicle c is abruptly accelerated as shown in FIG. 4A, the occupant m is abruptly pressed against the seat s as shown in FIG. 4B. If the acceleration in the front-rear direction exceeds a predetermined value, the emergency locking retractor 22 is activated. In addition, since the occupant m is pressed against the seat s, the webbing 5 is loosened for a moment. As a result, the webbing 5 is wound around the belt reel 12 due to a force from the return spring.

Figure 5:
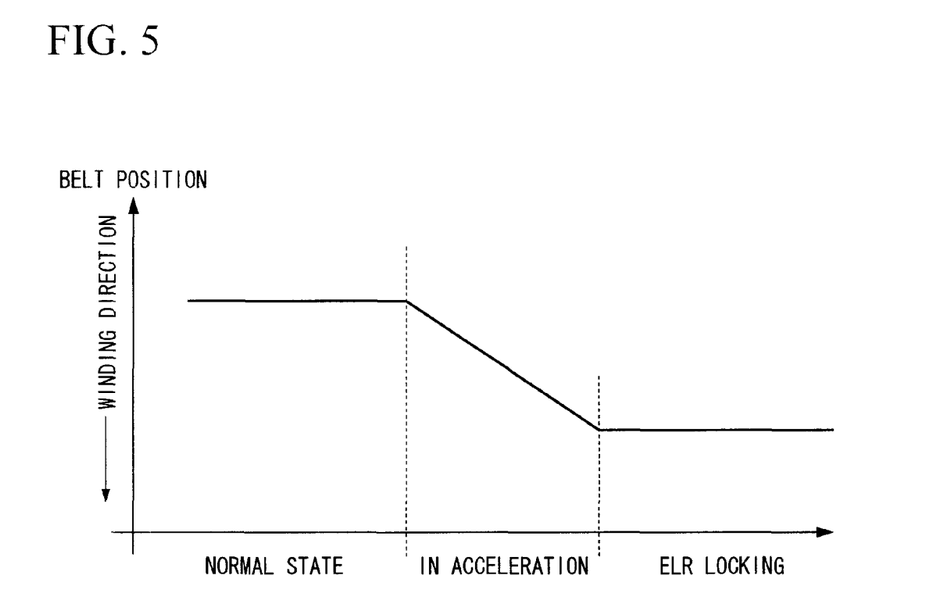
FIG. 5 is a view showing variation of a rotational position of a belt reel in the first situation according to the embodiment.

FIG. 5 shows variation of the rotational position of the belt reel 12 in such situation.

As shown in the figure, in special circumstances such as the following (a) and (b), the emergency locking retractor 22 (ELR) tends to keep locking.

(a) After the acceleration of the vehicle is stopped, a load from the upper body of the occupant m acts on the webbing 5, and thus a tensile force against the return spring keeps acting on the webbing 5.

(b) After the acceleration of the vehicle is stopped, the belt reel 12 cannot rotate in the webbing winding direction by the force from the return spring because the occupant is tightly fastened by the webbing 5.

In view of such circumstances as described above, the locking is forcibly released by the driving motor 10 if the locking state continues for greater than or equal to a predetermined amount of time.

Meanwhile, when the vehicle c travels on a rough road as shown in FIG. 6A, the emergency locking retractor 22 is activated due to the impact when passing bumps or potholes on the road. In addition, the upper body of the occupant is swung to the front, rear, left, and right every time the vehicle passes a bump or a pothole. Consequently, the webbing 5 is wound by a force from the return spring little by little.

Figure 7:
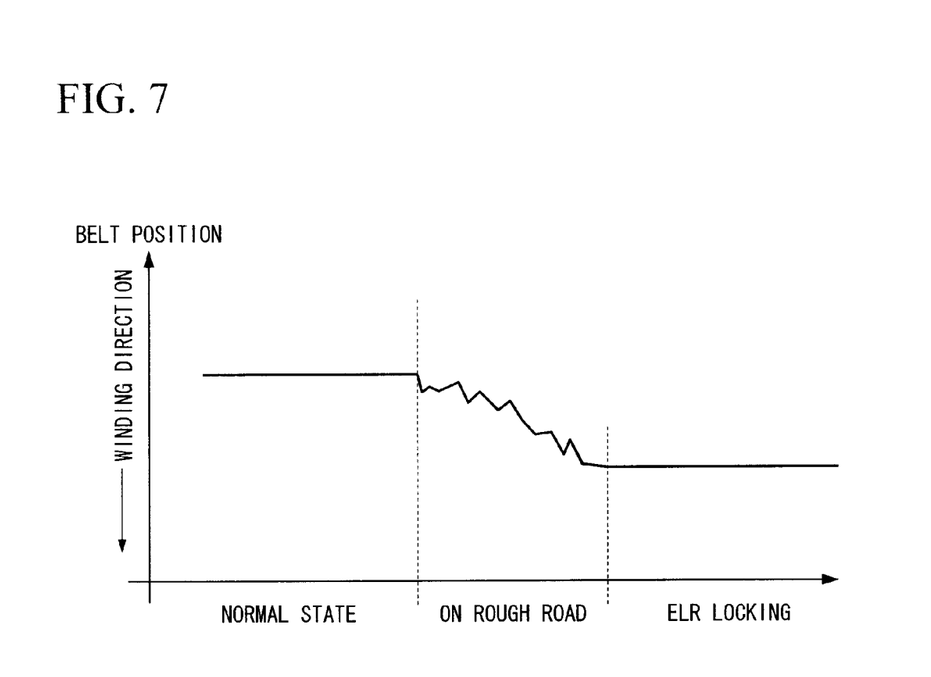
FIG. 7 is a view showing variation of a rotational position of a belt reel in the second situation which is supposed in the control according to the embodiment.

FIG. 7 shows variation of the rotational position of the belt reel 12 in such a situation.

As shown in the figure, in the special circumstances such as (a) and (b) described above, the emergency locking retractor 22 (ELR) tends to keep locking.

In this case as well, the locking is forcibly released by the driving motor 10 if the locking state continues for greater than or equal to a predetermined amount of time.

Figure 8:
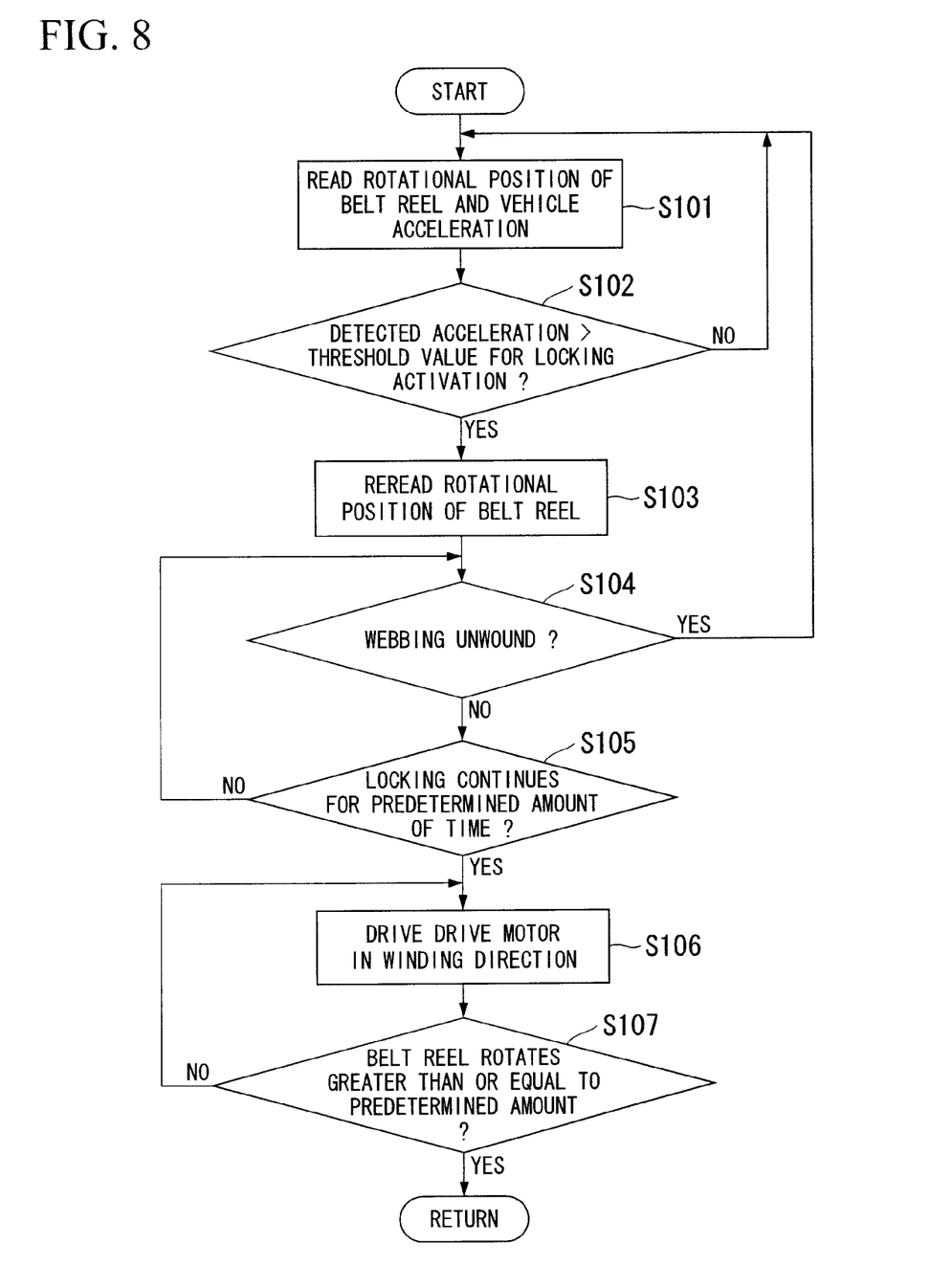
FIG. 8 is a flow chart showing a flow of the control according to the embodiment.

The control by the controller 21 of the first embodiment will be described below with reference to the flow chart in FIG. 8.

In step S101, the rotational position of the belt reel 12 and the acceleration of the vehicle in the front-rear and left-right directions are read.

In the next step S102, whether or not the acceleration of the vehicle exceeds a threshold value where the locking by the emergency locking retractor 22 is activated. If the determination result is "YES", then the process proceeds to step S103. If the determination result is "NO", then the process returns to step S101. Here, in particular, it is determined whether or not the emergency locking retractor 22 is activated.

In step S103, the rotational position of the belt reel 12 is read again. In the following step S104, the rotational position of the belt reel 12 at which the locking by the emergency locking retractor 22 is activated and the present rotational position of the belt reel 12 are compared. Based on the comparison result, it is determined whether or not the belt reel 12 rotates in the webbing unwinding direction.

If the determination result in step S104 is "YES", the process returns to step S101. If the determination result in step S104 is "NO", the process proceeds to step S105.

In step S105, it is determined whether or not the determination (i.e., the belt reel 12 does not rotate in the webbing unwinding direction) continues for greater than or equal to the predetermined amount of time. If the determination result is "YES", the process proceeds to step S106. If the determination result is "NO", the process returns to step S104.

In step S106, the driving motor 10 is driven to rotate in the webbing winding direction. In the consequent step S107, it is determined whether or not the belt reel 12 rotates greater than or equal to a predetermined amount at which the locking should be released.

If the determination result in step S107 is "YES", then the process returns to the beginning. If the determination result is "NO", then the process returns to step S106. In particular, until the belt reel 12 rotates greater than or equal to the predetermined amount to release the locking, electric current conduction to the driving motor 10 continues. It should be noted that if the belt reel 12 does not rotate greater than or equal to the predetermined amount after the electric current conduction to the driving motor 10 continues for a predetermined amount of time, the electric current conduction to the driving motor 10 is terminated after warning.

It may be determined whether or not the belt reel 12 rotates greater than or equal to a predetermined amount in the webbing unwinding direction if the determination result in step S107 is "YES". Further, if the belt reel 12 does not rotate greater than or equal to the predetermined amount, another winding by the driving motor 10 may be performed.

In the seatbelt apparatus of the first embodiment, the locking continuity determination device 41 determines whether or not the locking state continues after the activation of the emergency locking retractor 22. If it is determined that the locking state continues, the locking by the emergency locking retractor 22 is forcibly released by the driving motor 10, and thereby prevents an occupant from being unnecessarily fastened by the webbing 5. As a result, it is possible to reduce discomfort or unpleasant feeling which an occupant experiences and prevent the occupant's driving from being restricted.

Second Embodiment

In the controller 21 according to the present embodiment, the locking continuity determination device 41 performs a determination whether or not the locking continues after the vehicle goes into a condition where the emergency locking retractor 22 is activated. Based on the vehicle condition (vehicle speed) during the determination by the locking continuity determination device 41, the controller 21 changes conditions for starting the drive of the driving motor 10. As a result, the time when electric current conduction to the driving motor starts is adjusted in accordance with the vehicle condition.

The controller 21 according to the present embodiment is designed assuming predetermined conditions when the vehicle travels on a road with continuous curves, for example.

Figure 9:
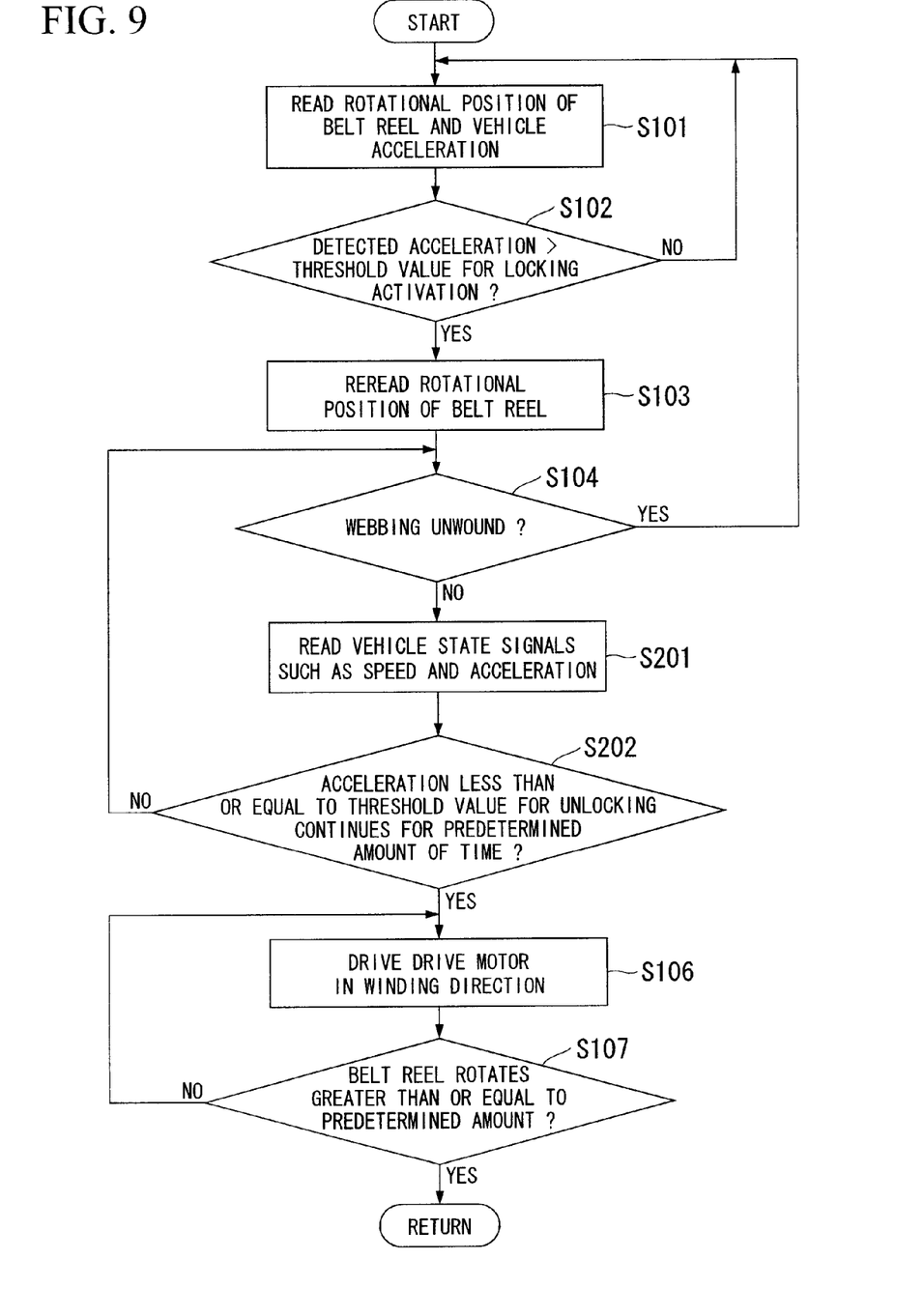
FIG. 9 is a flow chart showing a flow of a control according to a second embodiment of the present invention.

The control by the controller 21 of the second embodiment will be described below with reference to the flow chart in FIG. 9. It should be noted that steps being the same as those in the above first embodiment are denoted by the same reference symbols and detailed descriptions thereof are omitted.

In the control according to the second embodiment, steps from S101 with regard to reading information, to S104 regarding determination of rotation in the webbing unwinding direction, are the same as those in the first embodiment.

If the determination result in step S104 is "NO"; specifically if it is determined that the belt reel 12 does not rotate in the webbing unwinding direction, the process proceeds to step S201.

In step S201, signals indicating the present vehicle condition such as vehicle speed and acceleration (left-right acceleration and/or front-rear acceleration) are read.

In the consequent step S202, it is determined that the absolute value of the acceleration detected in step S202 continues to be less than or equal to an acceleration threshold value for unlocking (releasing the locking) for a predetermined amount of time.

Figure 10:
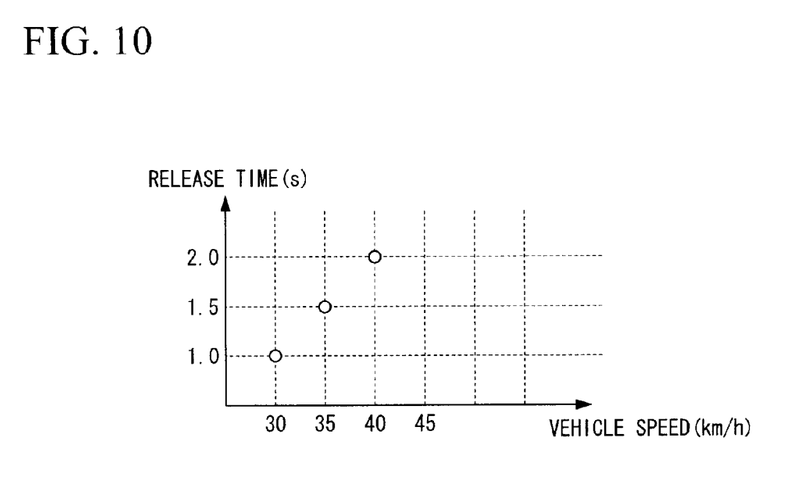
FIG. 10 is a view showing an example of setting of release time used in the control according to the embodiment.

Here, the acceleration threshold value for unlocking is a preset value, and the predetermined amount of time (release time) may be set to a value corresponding to the present vehicle speed with reference, for example, to a correspondence map as shown in FIG. 10. In this case, the faster the vehicle speed is, the longer the time (predetermined time) for determining whether or not the detected acceleration continues to be less than or equal to the threshold value for unlocking becomes. On the contrary, the slower the vehicle speed is, the shorter the time (predetermined time) determining whether or not the detected acceleration continues to be less than or equal to the threshold value for unlocking becomes.

Therefore, the faster the vehicle speed is, the longer (later) the time for the driving motor 10 to perform the releasing of the locking becomes.

Figure 11:
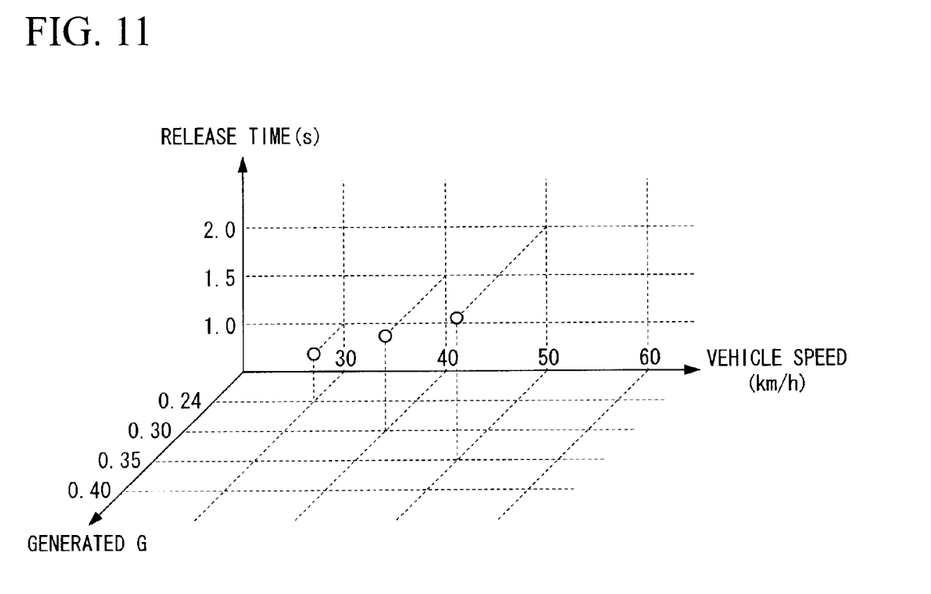
FIG. 11 is a view showing an example of setting of release timing and release acceleration used in the control according to the embodiment.

It should be noted that the acceleration threshold value for unlocking (release acceleration) as well as the predetermined time may be set with reference, for example, to a correspondence map as shown in FIG. 11. In this case, the reference for the vehicle stability as well as the determination time in accordance with the vehicle speed can be adjusted.

Moreover, the determination with regard to the releasing the locking in step S202 may be performed based on the leading edge of the acceleration by comparing derivative values of the acceleration (synthesized acceleration of the front-rear acceleration and the left-right acceleration) with the threshold value.

If the determination result in step S202 is "YES", then the process proceeds to step S107 through step S106 in which the driving motor 10 forcibly releases the locking by the emergency locking retractor 22 as is similar to the first embodiment. If the determination result is "NO", then the process returns to step S104.

As explained above, in the seatbelt apparatus of the second embodiment, if the locking state continues for a predetermined amount of time after the emergency locking retractor 22 is activated, the locking by the emergency locking retractor 22 is forcibly released by the driving motor 10, as is basically similar to the first embodiment. Thereby, the occupant can be prevented from being unnecessarily fastened by the webbing 5. As a result, it is possible to obtain the advantageous effect of improving comfort and operability.

In addition, in the second embodiment, the starting time when the driving motor 10 starts to release the locking is adjusted in accordance with the vehicle speed (traveling condition) during the determination whether or not the locking continues. Therefore, when the vehicle travels on a road with continuous curves at a high speed (in which the locking is performed immediately after the locking is released), the locking by the driving motor 10 is hardly released. On the contrary, when the vehicle travels on a curve road at a slow speed, the locking by the driving motor 10 is readily released.

Therefore, according to the present embodiment, it is possible to prevent the occupant from experiencing discomfort and unpleasant due to repeated locking and unlocking by the emergency locking retractor 22.

In the embodiments explained above, conditions for starting the driving of the driving motor 10 is changed in accordance with the vehicle speed during the determination by the locking continuity determination device 41. However, it may be arranged such that the waiting time for the motor to start actual driving is adjusted after satisfying the conditions for starting the driving.

Third Embodiment

In the present embodiment, the controller 21 performs determination by the locking continuity determination device 41 whether or not the locking continues after the vehicle goes into a condition where the emergency locking retractor 22 is activated. Based on a road condition (friction coefficient μ of the road) during the determination, the controller 21 changes conditions for starting the drive of the driving motor 10.

The controller 21 according to the present embodiment is designed assuming predetermined conditions when a VSA activation signal is input from the VSA controller is supposed, for example.

Figure 12:
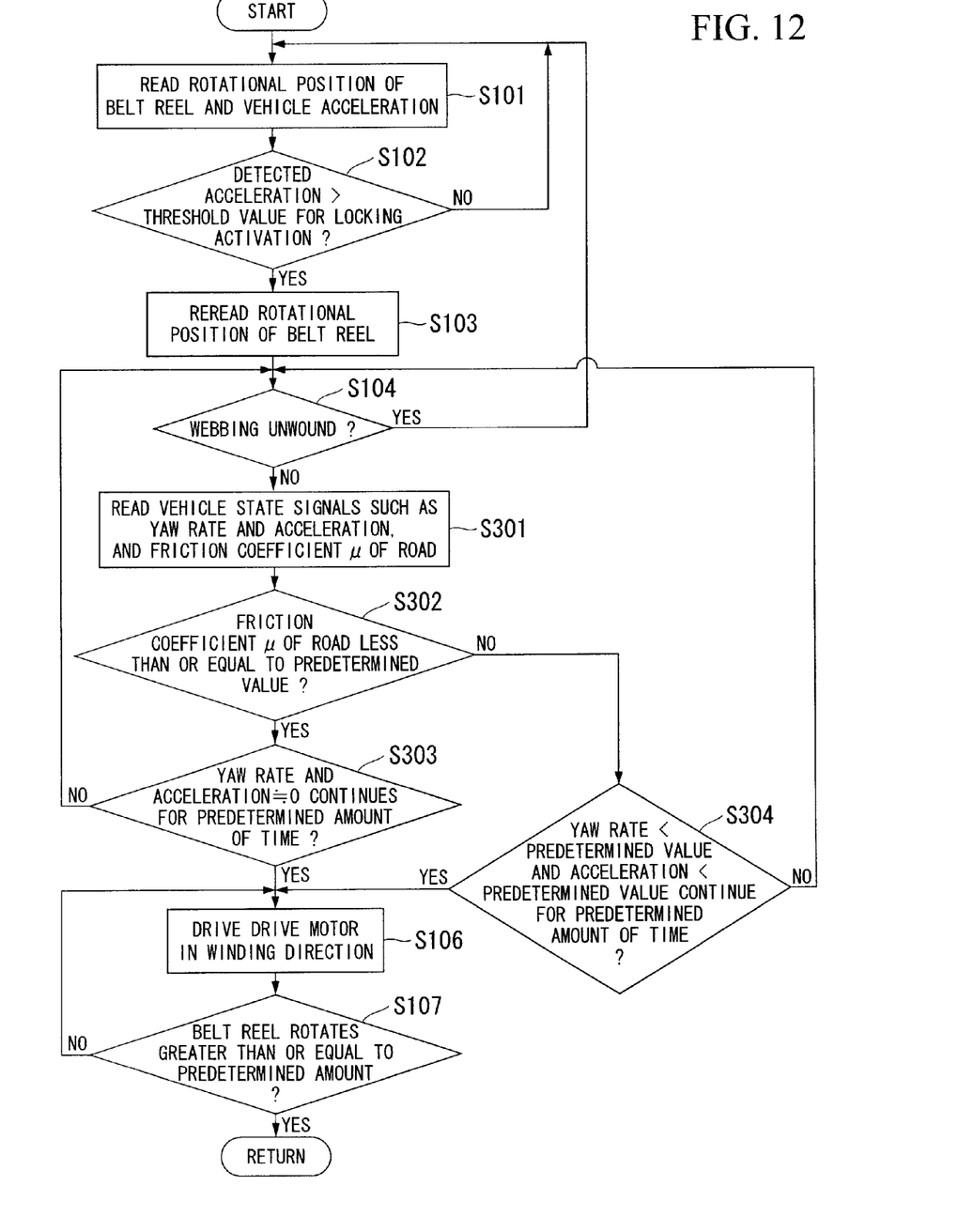
FIG. 12 is a flow chart showing a flow of a control according to a third embodiment of the present invention.

The control by the controller 21 of the third embodiment will be described below with reference to the flow chart in FIG. 12. It should be noted that steps being the same as those in the above first embodiment are denoted by the same reference symbols and detailed descriptions thereof are omitted.

In the control according to the third embodiment, steps from S101 with regard to reading information, to S104 regarding determination of rotation in the webbing unwinding direction, are the same as those in the first embodiment.

If the determination result in step S104 is "NO"; specifically if it is determined that the belt reel 12 does not rotate in the webbing unwinding direction, the process proceeds to step S301.

In step S301, signals indicating the present vehicle condition such as the yaw rate and acceleration (left-right acceleration and/or front-rear acceleration), and a friction coefficient μ of the road on which the vehicle presently travels are read. The friction coefficient μ of the road is calculated based on the driving status, the slip ratio of the wheel, and the like.

In the consequent step S302, it is determined whether or not the friction coefficient μ of the road is less than or equal to a predetermined value (value at which it is likely that the vehicle considerably slips). If the determination result is "YES", then the process proceeds to step S303. If the determination result is "NO", then the process proceeds to step S304.

In step 303, it is determined whether or not the yaw rate and the acceleration continue to be substantially zero for a predetermined amount of time. If the determination result is "YES", then the process proceeds to step S107. If the determination result is "NO", then the process returns to step S104. Accordingly, when the friction coefficient μ of the road is less than or equal to a predetermined value at which the vehicle likely to slip, the locking is not forcibly released in step S106 unless the vehicle becomes completely stable.

In step S304, it is determined whether or not the yaw rate and the acceleration continue to be less than or equal to a predetermined value that is enough greater than zero for a predetermined amount of time. If the determination result is "YES", then the process proceeds to step S106 and step S107. If the determination result is "NO", then the process returns to step S104. The control in this step is similar to that in step S303, but the threshold values of the yaw rate and the acceleration is greater. Therefore, the process proceeds to step S106 and step S107 while the vehicle condition is stable to some extent.

After the process proceeds to step S106 and step S107, the locking by the emergency locking retractor 22 is forcibly released by the driving motor 10 as is similar to the first embodiment.

In the case of the third embodiment, as is basically similar to the first embodiment, the locking by the emergency locking retractor 22 is forcibly released by the driving motor 10 under the condition that the tight fastening is unnecessary. Thereby, the occupant can be prevented from being unnecessarily fastened by the webbing 5. As a result, it is possible to improve comfort and operability.

Further, in the third embodiment, the threshold values of the yaw rate and the acceleration for unlocking can be changed in accordance with the road condition during the determination whether or not the locking continues. Therefore, it is always possible to appropriately perform the unlocking in accordance with the road condition.

It should be noted that the present invention is not limited to the above embodiments, and appropriate modifications may be made thereto without departing from the scope of the invention.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A seat belt apparatus for a vehicle, the apparatus comprising:
   a belt reel around which a webbing is wound;
   a driving motor which drives the belt reel to rotate;
   a control device which controls the driving motor;
   a rotational position detection device which detects a rotational position of the belt reel;
   a vehicle condition detection device which detects either a stable or an unstable behavior of the vehicle;
   an emergency locking retractor which is activated to perform a mechanical locking of the belt reel so as not to rotate in a direction of unwinding the webbing when the unstable behavior of the vehicle is detected by the vehicle condition detection device, said emergency locking retractor being operable to automatically release the locking if the belt reel rotates in a direction of winding the webbing greater than or equal to a predetermined amount; and
   a locking continuity determination device which determines whether or not the locking continues after the emergency locking retractor performs the locking, based on the vehicle condition detected by the vehicle condition detection device and variation of the rotational position of the belt reel detected by the rotational position detection device, wherein said locking being determined to be discontinued when said vehicle condition detection device detects the stable behavior of the vehicle and said belt reel rotational position varies in a direction of unwinding of said webbing; wherein
   the control device makes the driving motor rotate the belt reel in the winding direction an amount equal to or greater than the predetermined amount so as to release the locking of the emergency locking retractor when the locking continuity determination device determines that the locking continues for greater than or equal to a predetermined amount of time after detection of stable behavior by the vehicle condition detection device.

2. The seatbelt apparatus for a vehicle according to claim 1, wherein the control device adjusts the predetermined amount of time after which the driving motor starts driving to release the locking, based on the vehicle condition detected by the vehicle condition detection device during the determination by the locking continuity determination device.

3. The seatbelt apparatus for a vehicle according to claim 1, wherein based on a vehicle speed during the determination by the locking continuity determination device, the predetermined amount of time is set such that the faster the vehicle speed is, the longer the predetermined amount of time becomes.

4. The seatbelt apparatus for a vehicle according to claim 1, wherein the predetermined amount of time is changed based on a road condition during the determination by the locking continuity determination device.

* * * * *